(12) United States Patent
Wang et al.

(10) Patent No.: US 6,501,631 B1
(45) Date of Patent: Dec. 31, 2002

(54) METHOD AND DEVICE FOR POWER SYSTEM PROTECTION

(75) Inventors: Jianping Wang, Västerås (SE); Zoran Gaijc, Västerås (SE); Mikael Göransson, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/549,574

(22) Filed: Apr. 14, 2000

(51) Int. Cl.$^7$ .................................................. H02H 3/00
(52) U.S. Cl. ............................................................ 361/63
(58) Field of Search .............................. 361/42, 44, 62, 361/63, 65, 67; 700/286, 292–294; 702/57, 58, 64

(56) References Cited

U.S. PATENT DOCUMENTS

| | | | |
|---|---|---|---|
| 4,321,681 A | * 3/1982 | Sackin et al. | 700/293 |
| 4,544,980 A | 10/1985 | Serrie et al. | 361/45 |
| 4,617,636 A | * 10/1986 | Johns et al. | 700/293 |
| 4,825,326 A | * 4/1989 | Andow et al. | 361/63 |
| 4,862,308 A | 8/1989 | Udren | 361/45 |
| 5,375,026 A | * 12/1994 | Eriksson et al. | 361/63 |
| 5,809,045 A | 9/1998 | Adamiak et al. | 371/78 |

* cited by examiner

Primary Examiner—Ronald W. Leja
(74) Attorney, Agent, or Firm—Dykema Gossett, PLLC

(57) ABSTRACT

A method for protecting a zone in a power system, which has a number of transmission lines connected to power sources and a number of transmission lines connected to a number of loads, where the power sources and the loads are arranged outside the zone. Continuously measuring all the incoming currents ($I_{in}$) to the zone, continuously measuring all the outgoing currents ($I_{out}$) from the zone, and continuously calculating the differential current ($I_d$) according to $$I_d = I_{in} - I_{out}.$$

Continuously integrating $I_{in}$, $I_{out}$ and $I_d$ according to $$I_{IN} = \int_{tl}^{(tl+T)} I_{in} dt \quad (5)$$

$$I_{OUT} = \int_{tl}^{(tl+T)} I_{out} dt \quad (6)$$

$$I_D = \int_{tl}^{(tl+T)} I_d dt \quad (7)$$

wherein T is the fundamental frequency cycle. Changes of the continuously integrated values $I_{in}$, $I_{OUT}$ and Id are indications of whether faults in the power system occur within or outside a zone. A computer program implements performance of the method.

13 Claims, 4 Drawing Sheets

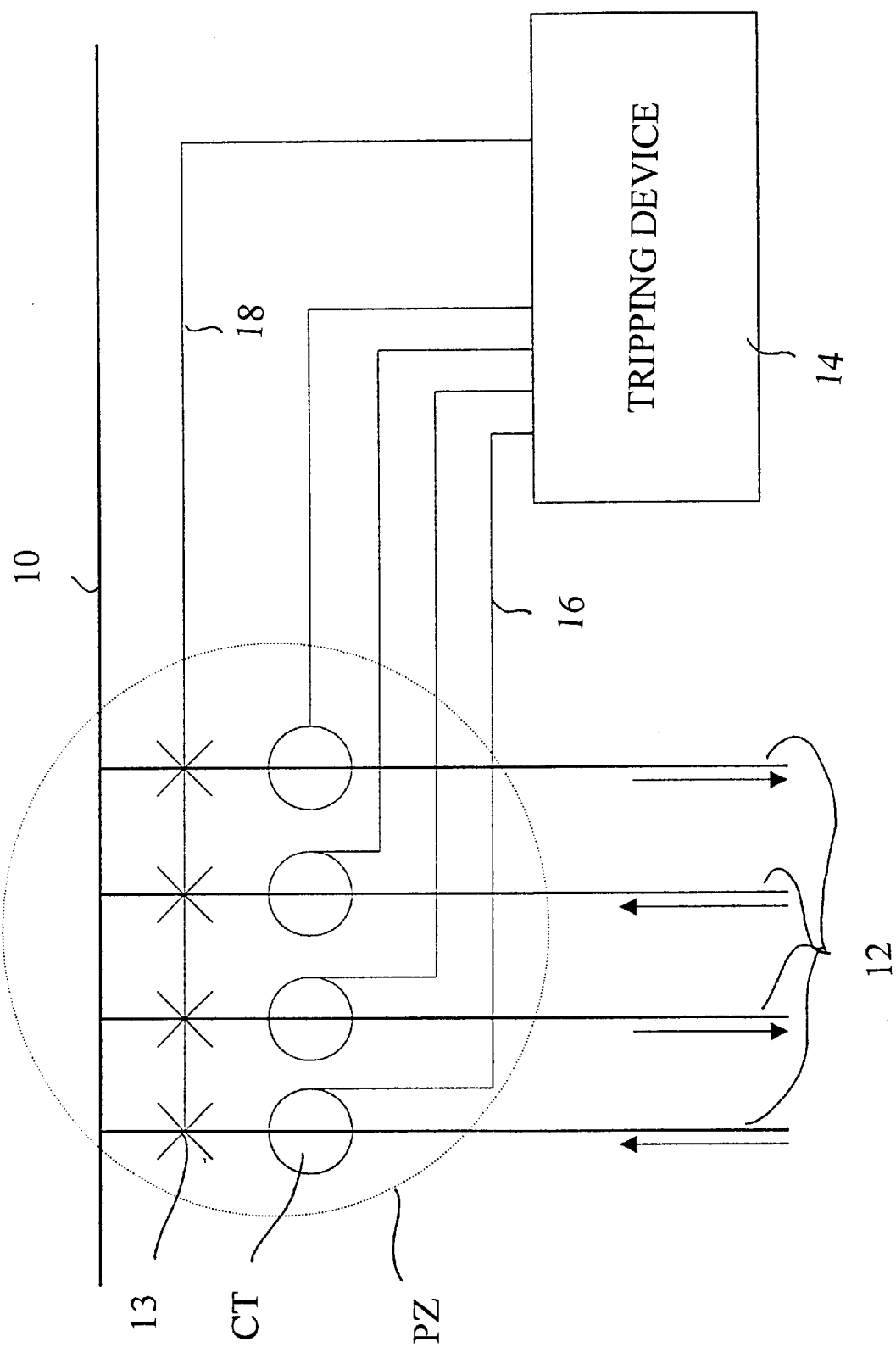

METHOD AND DEVICE FOR POWER SYSTEM PROTECTION

TECHNICAL FIELD

The present invention relates to a method for protecting a zone in a power system, which zone comprises a number of transmission lines connected to power sources and a number of transmission lines connected to a number of loads where the power sources and the loads are arranged outside the zone, wherein the method comprises the steps of: continuously measuring all the incoming currents ($I_{in}$) to the zone, continuously measuring all the outgoing currents ($I_{out}$) from the zone, and continuously calculating the differential current ($I_d$) according to $I_d=I_{in}-I_{out}$.

BACKGROUND OF THE INVENTION

During a number of years there has been a rapid development of power systems and the capacity requirements of these in turn require highly reliable relaying principles for protecting the system or components of the system in case of faults. These protection requirements apply to many parts of the power system such as for example transformer differential protection, motor differential protection, generator differential protection and busbar protection.

In this kind of protection system, the incoming and outgoing currents of a certain protection zone has been measured since these may be used to detect if a fault occurs within or outside the protection zone. In order to measure these currents, so called current transformers, or CT, are used, one on each incoming and outgoing line. Further each line is provided with a circuit breaker for breaking the line in case of a fault. Traditionally the secondary currents of all the CTs are lead to a central differential relay which calculates the differential and the restraint current, compares them and makes the decision whether to trip all breakers of the in- and outgoing lines of the protection zone. In the case of an internal fault, ie a fault within the protection zone, the differential relay should trip the breakers.

If however the differential relay trips all circuit breakers during an external fault, or misoperates in normal operating conditions, this will cause serious technical and economical consequences for the power system.

One solution to this is to have a distributed, or decentralised, algorithm processing principle. This principle is presented in the paper "Implementation of a distributed digital bus protection system", by He Jaili et al., IEEE Transaction on Power Deliver, Vol. 12, No. 4, October 1997. Here the whole bus protection system is divided into a number of protection units, each installed on one circuit of the bus, ie incoming and outgoing transmission line or transformer. All the protection units are connected by a data communication network. Each unit samples and compares instantaneous values of the differential and restraint currents, and makes a decision whether or not to trip its own circuit breaker.

The low impedance protection algorithm widely used in digital protection systems may be expressed as follows. If for example we suppose a busbar which connects N lines, the differential current $I_d$ and restraint current $I_r$ among these lines are expressed as $$I_d = \left| \sum_{i=1}^{N} I_i \right| \quad (1)$$

$$I_r = \sum_{i=1}^{N} |I_i| \quad (2)$$

$$I_d - kI_r > D \quad (3)$$

In case of an internal fault, then $I_d=I_r$ and equation (3) can be confirmed if proper values to k (k<1) and D are chosen. Equation (3) is also known as the percentage differential protection since it introduces the restraint current in order to make the protection more stable for external faults.

In the case of normal loads or external faults, $I_d$ should be zero in order for equation (3) to be satisfied and no trip signal will be issued.

However, for external faults, $I_d$ will be greater than zero during the saturation period of the CT, causing a misoperation during this time period. Saturation occurs as a result of unpredictably high fault currents, during which, the CT saturates and produces erroneous non-proportional values for the actual current. The main technical problem for the differential protection algorithm is thus misoperation due to external faults principally because the saturation of the CT in the faulted line will produce a picture similar to an internal fault in the measuring circuits, that is to say, the differential current $I_d$ will be the same as the restraint current $I_r$ during the saturation period of the CT when an external fault occurs.

Another problem with the above system is that it, due to the above mentioned transformer saturation problems, requires a stabilised restraint current signal to keep stability in the case of an external fault. As a consequence the tripping time is increased to above 20 milliseconds. For many systems it is however required to have faster tripping signals, preferably below 15 milliseconds due to system stability and safety requirements.

BRIEF DESCRIPTION OF THE INVENTION

One object of the present invention is to provide a fast tripping algorithm for power system protection that remedies the above mentioned problems encountered with present technology.

An additional object of the present invention is to provide a means to guarantee supply of electric power through a protected zone in a case when a fault is external to the protected zone.

The present invention displays a number of advantages over the state of the art. Since the integrated values of the incoming, outgoing and differential currents are used for determining where a fault has occurred, much more stable values are obtained. This means that the evaluation will be more reliable and accurate and that external faults will not wrongly trip the protection device. Because the rate of change values, based on the incoming, outgoing and differential currents, display very characteristic behaviour depending on whether the fault is inside or outside the protection zone, the risk of wrongly tripping the system is substantially reduced.

Further the protection device will not be influenced by current transformer saturation with the present invention. With the algorithm presented, a very fast tripping signal may be obtained that operates either well below the fault current levels or well below the operational time of conventional protection devices.

Another advantage of an embodiment of the present invention is that the method may be used to guarantee power transmission through a protected area in the case of a fault that is external to the protected area. Such a guarantee of assured supply with greatly reduced risk of power outages, brownouts etc, due to faulty tripping in a protected area is of great economic benefit, especially to a supplier of electrical power. Such a guarantee facilitates the avoidance of unnecessary loss of supply leading to extremely expensive consequences in terms of lost production, scrapped production, downtime of expensive plant and so on.

These and other aspects of, and advantages with, the present invention will become apparent from the detailed description and from the accompanying drawings.

BRIEF DESCRIPTION OF THE DRAWINGS

In the detailed description of the invention, reference will be made to the accompanying drawings, of which FIG. 5 shows schematically a device for performing the method according to the invention.

DETAILED DESCRIPTION OF THE INVENTION

The present invention relates to protection of power systems, and in particular to areas of power systems having no sources or loads within those areas. These areas will hereafter be named protection zones PZ. Within these zones a number of feed lines connected to external sources are arranged as well as a number of feed lines connected to external loads. External in this context means outside the protection zone. The protection zone does not contain any sources or loads and can be seen as a passive part of a power system.

Figure 1:
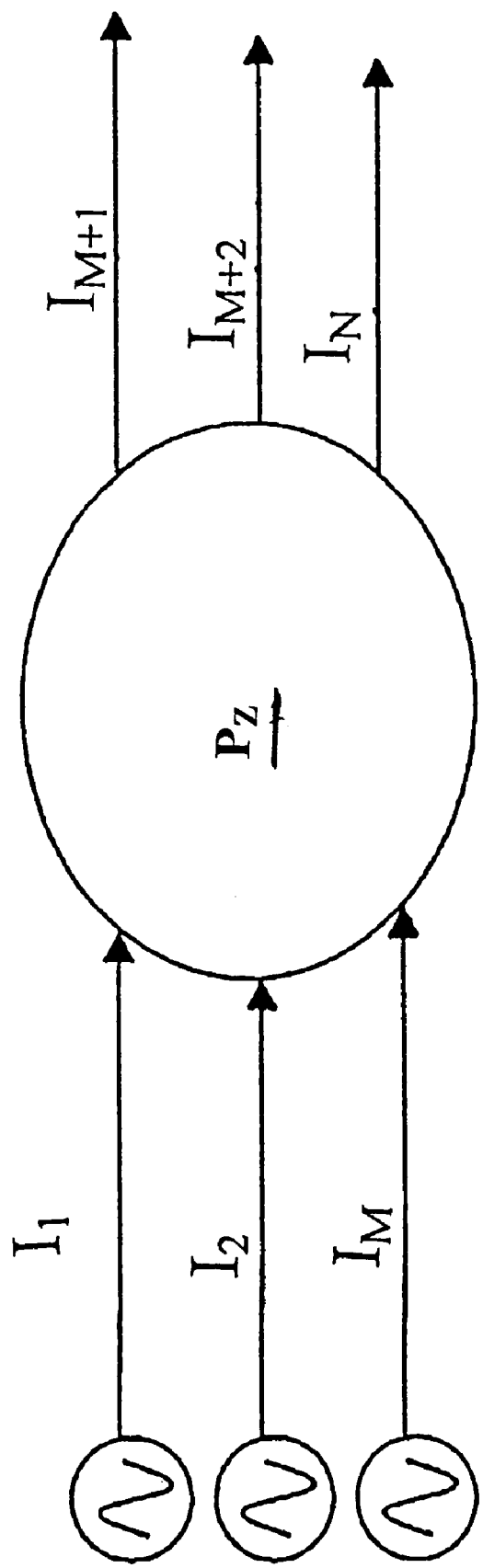
FIG. 1 shows schematically the principle of a protection zone according to the invention.

In FIG. 1 is shown schematically the principle of the protection zone PZ. The total current from all sources entering the zone is referred to as $I_{in}$ and the total current to all loads from PZ is referred to as $I_{out}$. The currents are conventionally measured by current transformers CT. For a given PZ it is quite clear that all incoming currents have to be equal to the outgoing currents in normal load cases, when the PZ is defined as above, ie $I_{in}=I_{out}$ or $I_{out}/I_{in}=1$. This is also true if an external fault occurs.

If one phase is considered in a PZ and we suppose that N feed lines are present in a certain PZ, the incoming current $I_{in}$ and outgoing current $I_{out}$ of the phase can be obtained by equations (1) and (2):

$$I_{in} = \left| \sum_{i=1}^{M} Ii \right| \quad (1)$$

$$I_{out} = \left| \sum_{i=M+1}^{N} Ii \right| \quad (2)$$

Here, the index i from 1 to M corresponds to the incoming currents to PZ and i from M+1 to N corresponds to the outgoing currents from the protection zone.

The instantaneous values of the differential current $I_d$ and the restrained current $I_r$ can be expressed by $I_{in}$ and $I_{out}$ as $$I_d = I_{in} - I_{out} \quad (3)$$

$$I_r = I_{in} + I_{out} \quad (4)$$

In order to have stable values of the incoming current $I_{in}$ and the outgoing current $I_{in}$ for a certain protection zone, integrated values of these currents as well as $I_d$ can be obtained by integration over each fundamental frequency cycle T as $$I_{IN} = \int_{t1}^{(t1+T)} I_{in} dt \quad (5)$$

$$I_{OUT} = \int_{t1}^{(t1+T)} I_{out} dt \quad (6)$$

$$I_D = \int_{t1}^{(t1+T)} I_d dt \quad (7)$$

The integrated values obtained from equations (5)–(7) will be used to form an algorithm by which faults inside the protection zone are detected very fast and by means of which a very fast tripping signal may be generated, disconnecting the zone from the power system.

For most power systems, in case of serious faults, tripping must be done very quickly because of the stability of the system but also in order to prevent serious damages. Preferably a tripping signal should be produced within 5 ms following internal faults.

This may be achieved with the present invention by using the rate of change of the integrated continuous values of $I_{IN}$, $I_{OUT}$ and $I_D$. The fact that all of these three integration values are one variable function in the time domain if a continuous integration is performed is used. This means that integration values will change depending on when the integration is performed. If we suppose that $$k_1(t) = d(I_D(t))/dt$$

$$k_2(t) = d(I_{IN}(t))/dt$$

$$k_3(t) = d(I_{OUT}(t))/dt \quad (8)$$

where $k_1$, $k_2$, $k_3$ are rate of chance values. If a discrete time domain system is used, the rate of change values may be expressed as $$k_1(i) = I_D(i) - I_D(i-1)$$

$$k_2(i) = I_{IN}(i) - I_{IN}(i-1)$$

$$k_3(i) = I_{OUT}(i) - I_{OUT}(i-1)$$

Here, index i corresponds to the sampling instant in the discrete time domain and i−1 corresponds to the previous sampling time.

It has been shown that there exists differences for the factors $k_1(i)$, $k_2(i)$ and $k_3(i)$ for different cases such as normal load, external faults and internal faults. This is shown in table 1 below.

| Normal load cases | External fault cases | Internal fault cases |
|---|---|---|
| $k_1(i) = 0$ | $k_1(i)$ increases after saturation of current transformer | $k_1(i)$ increases |
| $k_2(i) = 0$ | $k_2(i)$ increases | $k_2(i)$ increases |
| $k_3(i) = 0$ | $k_3(i)$ increases before saturation of current transformer | $k_3(i)$ decreases |

By continuously monitoring the rate of change values $k_1$, $k_2$ and $k_3$ a logic may be created for producing a fast tripping signal.

Figure 2:
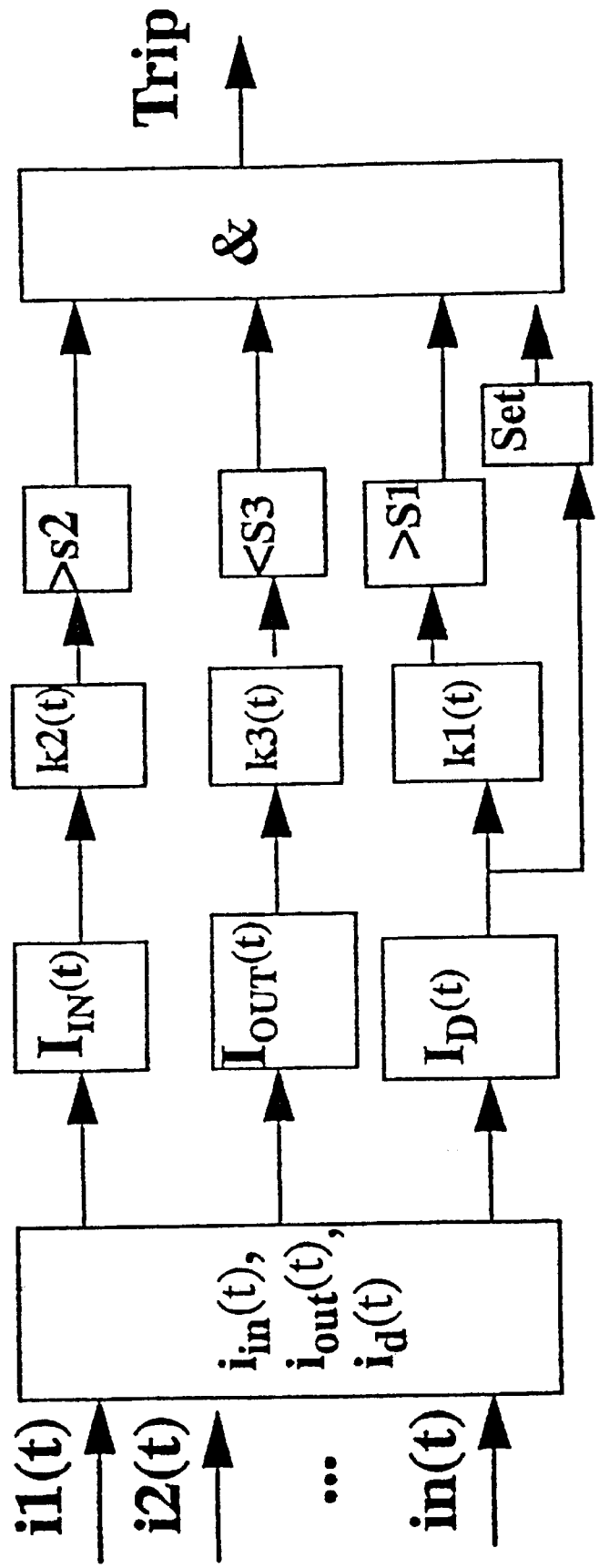
FIG. 2 shows a flow chart for a fast tripping logic.

The logic for tripping when an internal fault occurs may by built up as is shown in FIG. 2.

The factors $k_1$, $k_2$ and $k_3$ are each checked against set threshold values, $s_1$, $s_2$, and $s_3$ respectively, in three separate comparators. As seen from table 1 above the logic is designed to work as follows. Since $k_1(i)$ increases during an internal fault, it is checked if it reaches above the set value $s_1$, since $k_2(i)$ also increases during an internal fault, it is checked if it reaches above the set value $s_2$ and since $k_3(i)$ decreases during an internal fault, it is checked if it reaches below the set value $s_3$. The comparators are connected to an AND function and if the AND function reaches signals from all the comparators a signal is transmitted to a second AND function.

The integrated value $I_D(i)$ is also checked against a set threshold value in a separate comparator. In this case for internal faults $I_D(i)$ should be above a set pickup value. If so, a signal will sent to the second AND function and together with the signal from the first AND function a tripping signal will be issued.

During tests of the fast tripping algorithm and logic of the present invention it has been found that the threshold values $s_1$, $s_2$ and $s_3$ should be in the range 5–50% of the integrated value of the incoming current, and preferably 5–25%.

Figure 3:
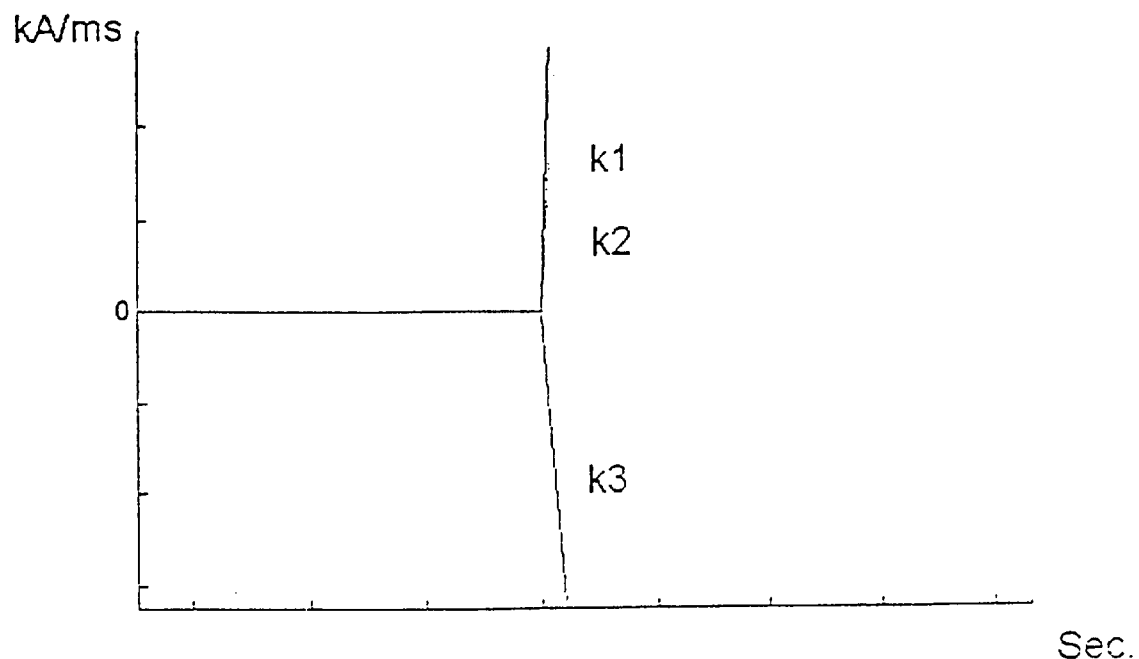
FIG. 3 shows an example of a test result for an internal fault when using the method according to the invention.

FIG. 3 shows as an example a diagram over a test of the present invention for an internal fault. As can be seen from the diagram the rate of change values $k_1(i)$, $k_2(i)$ and $k_3(i)$ all have distinct peaks just at the occurrence of an internal fault, where $k_1(i)$ and $k_2(i)$ increase while $k_3(i)$ decreases.

Figure 4:
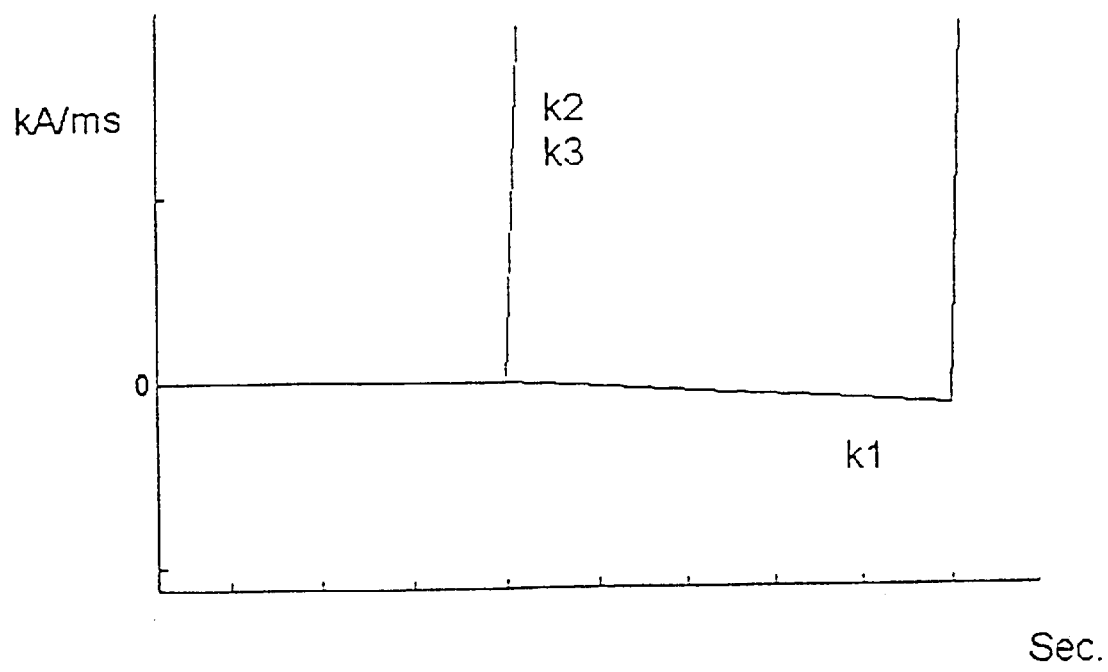
FIG. 4 shows an example of a test result for an external fault when using the method according to the invention.

FIG. 4 shows another test example for an external fault. In this case $k_2(i)$ and $k_3(i)$ increase rapidly just at the occurrence of an external fault, while $k_1(i)$ remains unchanged until the CT saturates and $k_1(i)$ increases rapidly.

As can be seen from the examples, there are very distinct differences between internal and external faults. Further, with the method according to the invention a very fast tripping signal may be obtained.

FIG. 5 schematically shows how the method according to the invention may be implemented in a power system. A busbar 10 is connected to a number of transmission lines 12, where some are incoming lines connected to power sources and some are outgoing lines connected to loads. The connection of the transmission lines to the busbar is considered to be the protection zone PZ.

Each transmission line is arranged with a current transformer CT. Each transmission line is further provided with a breaker 13, capable of breaking the connection. The CTs are connected to a fast tripping device 14 via lines 16. The CTs are designed to provide currents that are proportional to the currents of the transmission lines. The fast tripping device comprises means for carrying out the steps of measuring the currents, calculating the differential current, integrating the currents, differentiating the integrated values in order to obtain the rate of change values, comparing the rate of change values with threshold values and producing a tripping signal. The tripping signal is transmitted to all breakers arranged on the transmission lines via line 18. The fast tripping device may comprise filters for filtering the signals. converters for sampling the signals and one or more micro computers. The micro processor (or processors) comprises a central processing unit CPU performing the steps of the method according to the invention. This is performed with the aid of a dedicated computer program, which is stored in the program memory. It is to be understood that the computer program mat also be run on a general purpose industrial computer instead of a specially adapted computer.

The software includes computer program code elements or software code portions that make the computer perform the method using equations, algorithms, data and calculations previously described. A part of the program may be stored in a processor as above, but also in a ROM, RAM, PROM or EPROM chip or similar. The program in part or in whole may also be stored on, or in, other suitable computer readable medium such as a magnetic disk, CD-ROM or DVD disk, hard disk, magneto-optical memory storage means, in volatile memory, in flash memory, as firmware, or stored on a data server.

A further embodiment of the present invention constitutes a method to guarnatee supply of electric power through a protected zone by means of determining if a detected fault is external to the zone or not. The fast tripping method and algorithm according to the invention is used to determine if a fault is external or not, and so guarantee that a protection device in the protected zone will not trip in response to an external fault.

The method comprises supplying a power network with a fast tripping device as described above functioning according to the method and logic as described above. The method to assure supply is a method to reduce the risk of power outages due to faulty tripping in a protected zone, leading to loss of supply. Loss of supply can have extremely expensive consequences in terms of lost production, scrapped production, downtime of expensive plant and so on.

It is to be understood that the embodiments described above and shown on the drawings are to be regarded as non-limiting examples of the present invention and that it is defined by the appended patent claims.

What is claimed is:

1. Method for protecting a zone in a power system, which zone comprises a number of transmission lines connected to power sources and a number of transmission lines connected to a number of loads where the power sources and the loads are arranged outside the zone, wherein the method comprises the steps of:

continuously measuring all the incoming currents ($I_{in}$) to the zone, continuously measuring all the outgoing currents ($I_{out}$) from the zone, and continuously calculating the differential current ($I_d$) according to $$I_d = I_{in} - I_{out},$$

and continuously integrating $I_{in}$, $I_{out}$ and $I_d$ according to $$I_{IN} = \int_{tI}^{(tI+T)} I_{in} dt \qquad (5)$$

-continued $$I_{OUT} = \int_{tl}^{(tl+T)} I_{out} dt \quad (6)$$

$$I_D = \int_{tl}^{(tl+T)} I_d dt \quad (7)$$

where T is the fundamental frequency cycle, whereby changes of the continuously integrated values $I_{IN}$, $I_{OUT}$ and $I_D$ constitute indications of whether faults on the power system occur within or outside the zone.

2. Method according to claim 1, further comprising using the indications of the values $I_{IN}$, $I_{OUT}$ and $I_D$ for producing a tripping signal to break the connection of the transmission lines in respect of a fault within the zone.

3. Method according to claim 1 further comprising continuously differentiating the values of $I_{in}$, $I_{out}$ and $I_d$ according to $$k_1(t) = d(I_D(t))/dt$$
$$k_2(t) = d(I_{IN}(t))/dt$$
$$k_3(t) = d(I_{OUT}(t))/dt,$$

where $k_1$, $k_2$ and $k_3$ constitute rate of change values, and using a discrete time domain system, wherein the rate of change values are expressed as $$k_1(i) = I_D(i) - I_D(i-1)$$
$$k_2(i) = I_{IN}(i) - I_{IN}(i-1).$$
$$k_3(i) = I_{OUT}(i) - I_{OUT}(i-1)$$

4. Method according to claim 3, further comprising continuously comparing the rate of change values $k_1(i)$, $k_2(i)$ and $k_3(i)$ with set threshold values in a logic, and when the logic is fulfilled, producing a tripping signal.

5. Method according to claim 4, further comprising continuously comparing the integrated value of $I_D$ with a threshold value in said logic, and when the logic is fulfilled, producing a tripping signal in respect of a fault within the zone.

6. Device for protecting a zone in a power system, which zone (PZ) comprises a number of transmission lines connected to power sources and a number of transmission lines connected to a number of loads where the power sources and the loads are arranged outside the zone, comprising means (CT) for continuously measuring all the incoming currents to the zone, means (CT) for continuously measuring all the outgoing currents from the zone, and means for continuously calculating the differential current according to $$I_d = I_{in} - I_{out},$$

and means for continuously integrating $I_{in}$, $I_{out}$ and $I_d$ according to $$I_{IN} = \int_{tl}^{(tl+T)} I_{in} dt \quad (5)$$

$$I_{OUT} = \int_{tl}^{(tl+T)} I_{out} dt \quad (6)$$

$$I_D = \int_{tl}^{(tl+T)} I_d dt \quad (7)$$

where T is the fundamental frequency cycle, whereby changes of the continuously integrated values $I_{in}$, $I_{out}$ and $I_d$ constitute indications of whether faults on the power system occur within or outside the zone.

7. Device according to claim 6, wherein transmission lines are arranged with circuit breakers (13) and means for producing a tripping signal to all breakers in said zone to disconnect the connection of the transmission lines based on the indications of the values $I_{IN}$, $I_{OUT}$ and $I_D$.

8. Computer program product comprising computer code means and/or software code portions for making a computer or processor perform the steps of:

continuously measuring all the incoming currents ($I_{in}$) to the zone, continuously measuring all the outgoing currents ($I_{out}$) from the zone, and continuously calculating the differential current ($I_d$) according to $$I_d = I_{in} - I_{out},$$

and continuously integrating $I_{in}$, $I_{out}$ and $I_d$ according to $$I_{IN} = \int_{tl}^{(tl+T)} I_{in} dt \quad (5)$$

$$I_{OUT} = \int_{tl}^{(tl+T)} I_{out} dt \quad (6)$$

$$I_D = \int_{tl}^{(tl+T)} I_d dt \quad (7)$$

where T is the fundamental frequency cycle, whereby changes of the continuously integrated values $I_{IN}$, $I_{OUT}$ and $I_D$ constitute indications of whether faults on the power system occur within or outside the zone.

9. Computer program product according to claim 8, further comprising evaluating the indications of the values $I_{IN}$, $I_{OUT}$ and $I_D$ and producing a tripping signal to disconnect the connection of the transmission lines.

10. Computer program product according to claim 8 further comprising continuously differentiating the values of $I_{in}$, $I_{out}$ and $I_d$ according to $$k_1(t) = d(I_D(t))/dt$$
$$k_2(t) = d(I_{IN}(t))/dt$$
$$k_3(t) = d(I_{OUT}(t))/dt$$

where $k_1$, $k_2$ and $k_3$ constitute rate of change values, and using a discrete time domain system, wherein the rate of change values are expressed as $$k_1(i) = I_D(i) - I_D(i-1)$$
$$k_2(i) = I_{IN}(i) - I_{IN}(i-1).$$
$$k_3(i) = I_{OUT}(i) - I_{OUT}(i-1)$$

11. Computer program product according to claim 10, further comprising continuously comparing the rate of change values $k_1(i)$, $k_2(i)$ and $k_3(i)$ with set threshold values in a logic, and when the logic is fulfilled, producing a tripping signal.

12. Computer program product according to claim 11, comprising further continuously comparing the integrated value of $I_D$ with a threshold value in said logic, and when the logic is fulfilled, producing a tripping signal.

13. Computer program product according to claim 8, contained on, or in, a computer readable medium.

* * * * *